United States Patent [19]

Blustine et al.

[11] Patent Number: 4,980,925
[45] Date of Patent: Dec. 25, 1990

[54] MONOPULSE FIRST DETECTOR ARRAY

[75] Inventors: Martin R. Blustine, Waltham; Eileen Conaty, Chelmsford; Clifford A. Drubin, Groton; Thomas L. Korzeniowski, Bradford, all of Mass.

[73] Assignee: Raytheon Company, Lexington, Mass.

[21] Appl. No.: 293,159

[22] Filed: Jan. 3, 1989

[51] Int. Cl.⁵ .............................................. H04B 1/26
[52] U.S. Cl. .................................... 455/327; 455/325; 455/272; 455/326
[58] Field of Search ............... 455/313, 323, 317, 610, 455/272, 327, 325, 326, 328, 330; 342/75, 62

[56] References Cited

U.S. PATENT DOCUMENTS

| 4,619,001 | 10/1936 | Kane ................................... 455/326 |
| 4,654,887 | 3/1987 | Murphy et al. ...................... 455/327 |
| 4,675,911 | 6/1987 | Sokolov et al. ..................... 455/325 |
| 4,751,744 | 6/1988 | Pavio, Jr. ............................ 455/325 |

Primary Examiner—Robert L. Griffin
Assistant Examiner—Ralph Smith
Attorney, Agent, or Firm—Donald F. Mofford; Denis G. Maloney; Richard M. Sharkansky

[57] ABSTRACT

In a millimeter wave monopulse first detector array for use in seeker applications in a guided missile employing quasi-optical, or Gaussian beam, signal transmission, a first detector is shown to include a patch antenna array, a mixer and a power divider in a monolithic implementation for extraction of the monopulse information in a radar receiver.

5 Claims, 1 Drawing Sheet

MONOPULSE FIRST DETECTOR ARRAY

This invention was made with Government support under Contract No. F08635-84-C-0257 awarded by the Department of the Air Force. The Government has certain rights in this invention.

BACKGROUND OF THE INVENTION

This invention pertains generally to monopulse radar receivers in guided missiles, and particularly to an improved monopulse first detector array for a receiver in the millimeter wavelength band for use in seeker applications.

It is known to those of skill in the art that when monopulse radar techniques are employed, the radar receiver must separate the sum and difference signals to process and convert the monopulse information contained therein. Using a typical waveguide multimode horn feed, a fundamental frequency waveguide monopulse network is used to resolve the radar return into monopulse sum and difference channels containing the appropriate sum and difference signals. The three millimeter wavelength monopulse channels are then converted to an intermediate frequency (I.F.) using available waveguide mixers. An R.F. (radio frequency) waveguide approach to implementing the monopulse arithmetic network is large and requires precision machining or electroforming. Therefore, at millimeter wavelength frequencies, monopulse processing may be performed at an intermediate frequency in lieu of monopulse processing done at radio frequency (which is comparatively more tolerancesensitive and costly). In tactical weapons cost is of great concern. This is especially true for expendable weapons such as guided missiles. The use of a waveguide medium to process and convert the monopulse information is not a practical low cost solution suitable for high volume production. Monolithically constructed arrays for performing monopulse detection provide a more suitable alternative. Semiconductor processing techniques ensure mixer diode characteristics which are better and more repeatably matched. Therefore, more consistent electrical performance and lower production costs may be achieved.

SUMMARY OF THE INVENTION

With the foregoing background of this invention in mind, it is a primary object of this invention to provide an improved monopulse first detector array for a receiver in the millimeter wavelength band.

The foregoing and other objects of this invention are generally attained by providing a millimeter wavelength receiver constructed by monolithic techniques whereby using a patch radiator array, a mixer network and a Wilkinson local oscillator power divider network, the R.F. signals are first converted to intermediate frequencies (I.F.) where the monopulse information is then extracted.

BRIEF DESCRIPTION OF THE DRAWINGS

For a more complete understanding of this invention reference is to the following description of the drawings, wherein.

DESCRIPTION OF THE PREFERRED EMBODIMENT

Figure 1:
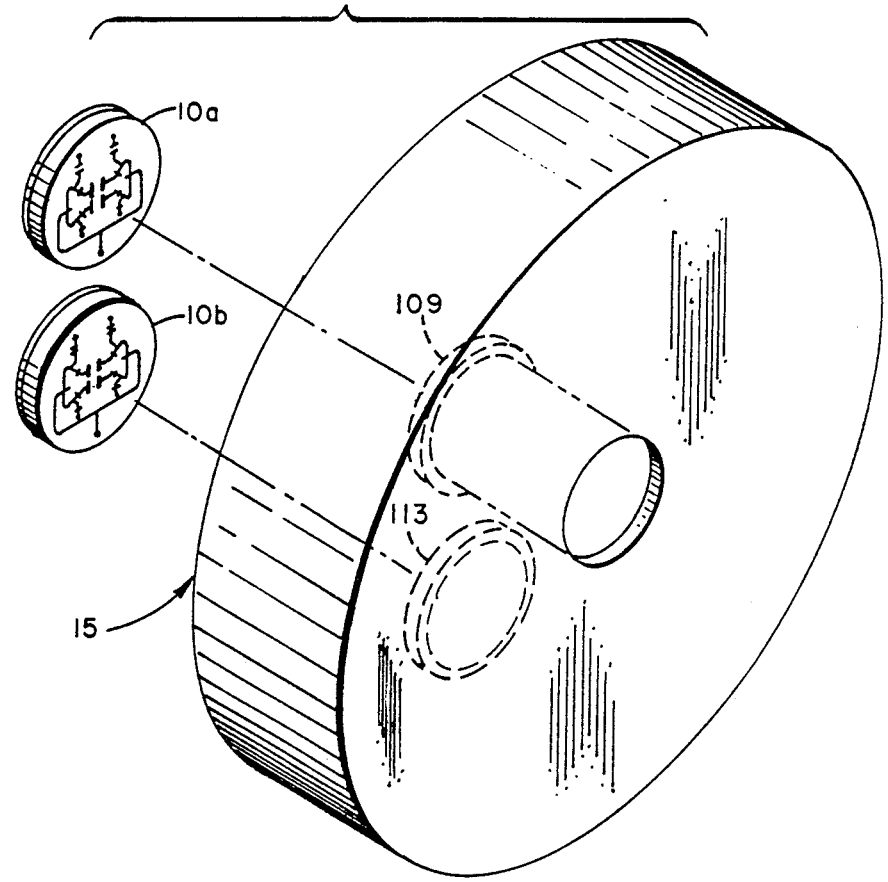
FIG. 1 is a sketch of the implementation of the monopulse first detector array according to this invention.

Referring now to FIG. 1, a monopulse first detector array 10a is shown as it could be used in a guided missile employing quasi-optical signal transmission.

It is known in the art, as shown in application Ser. No. 552,548, filed Oct. 31, 1983, entitled "Pulse Radar and Components Therefor," which application is assigned to the same assignee as this application, that in a receive mode a diplexer 15 is effective for resolving radio frequency (R.F.) signals including both left and right-handed circularly polarized (corresponding to reflections from either "single bounce" or "double bounce" objects) return signals into plane (linear) polarized signals and to optically couple such plane polarized signals to either monopulse first detector array 10a or monopulse first detector array 10b. In the receive mode, left-hand circularly polarized signals (corresponding to returns from so-called "single bounce" scatterers such as clutter) incident on the antenna port (not numbered) of diplexer 15 are converted into linearly (plane) polarized signals and will exit the so-called "left-hand" circular receive port 109. Monopulse first detector array 10a is mounted in receive port 109 in any known manner and is capable of detecting such signals (not shown) as described below.

Right-hand circularly polarized return signals (corresponding to return from so-called "double bounce" scatterers such as cultural objects) will be transformed by the diplexer 15 into linearly (plane) polarized signals and will exit the so-called "right-hand" circularreceive port 113. Receiver 10b is mounted in receive port 113 in any known manner and is capable of detecting such signals (not shown) as described below.

Figure 2:
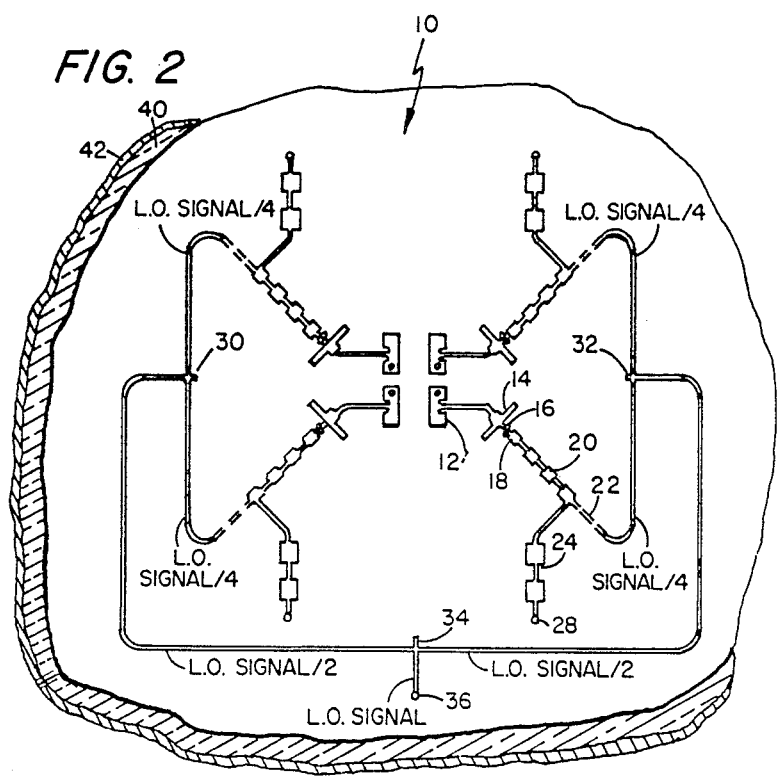
FIG. 2 is a plan view of a monopulse first detector array according to this invention.

Referring now to FIG. 2, a monopulse first detector array 10 is shown to include circuitry (not numbered) disposed on a flat surface, here designated gallium arsenide (GaAs) dielectric material 40. Such dielectric material is substantially without loss at the radio frequency energy to be detected. Metallic layer 42 is attached to the flat surface of the GaAs dielectric material 40, forming a ground plane for such circuitry. The circuitry is formed by depositing or printing a conducting material in any conventional manner on a portion of the surface of the GaAs dielectric material 40. The circuitry includes four balanced detectors (not numbered) constructed with anti-parallel diode pairs (not numbered) capable of heterodyning the radio frequency (R.F.) signals received with a local oscillator signal to produce intermediate frequency (I.F.) signals from which monopulse sum and difference signals are extracted.

The circuitry of all four of the balanced detectors is common; therefore, only one detector will be explained in detail although all four detectors operate in the same manner. Each detector includes a patch radiator 12 that, when located in a field of R.F. signals (not shown), is capable of intercepting such signals and coupling the signals via a transmission medium (not numbered) to a mixer 16. One who is skilled in the art will know patch radiator 12 is of rectangular shape and of such size as appropriate for the millimeter frequency of the desired signal. Holes (not numbered) placed in the patch radiator 12 at a voltage minimum provide a D.C. voltage return to the ground plane of metallic layer 42 for the I.F. signal without affecting the R.F. signal. Mixer 16 is capable of heterodyning a 4th subharmonic local oscillator signal (L.0. signal) (not shown) and an R.F. signal (not shown) producing an I.F. signal (not shown) having the monopulse information. The I.F. signal out of mixer 16 passes through R.F. termination 18 which stops the R.F. signals and allows the I.F. signals to pass and to continue through low pass matching filter 20 such that low pass matching filter 20 allows the desired signals to pass through while rejecting unwanted signals. The cutoff frequency of low pass filter 20 is designed to be high enough such that the 4th subharmonic local oscillator signal may pass. The I.F. signals pass through I.F. filter 24, which further filters the I.F. signals and rejects the L.0. signal. The I.F. signals are then coupled to the next stage (not shown) at I.F. signal output port 28.

The 4th subharmonic local oscillator signal (not shown) developed at a local oscillator (not shown) is applied to an input port 36 of monopulse first detector array 10. The L.0. signal is split by a power divider 34. Power divider 34 is a Wilkinson power divider capable of splitting an input signal and producing two output signals of equal phase and equal power. Such output signals (not shown) travel down equal length transmission mediums (not numbered) until they reach second Wilkinson power dividers 30, 32, respectively. A first local oscillator signal developed by power divider 34 reaches Wilkinson power divider 30 where the first local oscillator signal is divided once again. A second local oscillator signal developed by power divider 34 reaches Wilkinson power divider 32 where the second local oscillator signal is divided into two signals. Four local oscillator signals possessing equal power and equal phase have now been developed using Wilkinson power dividers. Each of the four local oscillator signals (L.0. signal) is heterodyned with the R.F. signals to produce the I.F. signals with the monopulse information. As in all the detector circuits (not numbered), the 4th subharmonic L.0. signal (not shown) passes through bandpass filter 22 which is a one-half wavelength resonator device. The L.0. signal continues through filter 20 and is applied to mixer 16 where the L.0. signal is heterodyned with the R.F. signal to produce the I.F. signal. Termination stub 14 is an R.F. ground for the local oscillator signal, thus preventing such signal from traveling down the transmission medium (not numbered) and radiating from the patch radiator 12.

The aperture of the monopulse first detector array 10 is masked with an R.F. absorptive material (not shown) with the exception of the area occupied by the patch radiators. An R.F. absorptive material such as EC-COSORB$_{(TM)}$, manufactured by Emerson and Cuming, a subsidiary of Dewey and Almy Chemical Division of W. R. Grace and Co. of Canton, MA, may be used. The R.F. absorptive material masks the circuitry to prevent the reception of unwanted signals. A quartz window (not shown) of one-half wavelength thickness may be placed over the patch radiator array to provide hermeticity.

Referring again to FIG. 1, a lens (not shown) may be placed between diplexer output port 109 and mixer array 10a and also diplexer output port 113 and mixer array 10b. The lens (not shown) focuses the R.F. signals from the output ports 109, 113 to a spot located at the center of the patch radiator array (not numbered). The lens (not shown) can be incorporated with a quartz hermetic envelope and replace the quartz window.

Having described this invention, it will now be apparent to one of skill in the art that the number and disposition of such monopulse first detector arrays may be changed without affecting this invention. It is felt, therefore, that this invention should not be restricted to its disclosed embodiment, but rather should be limited only by the spirit and scope of the appended claims.

What is claimed is:

1. In a monopulse receiver adapted to operate in a frequency band wherein the wavelength of any received signal is of millimeter length, monolithic circuitry for forming, at a first intermediate frequency by heterodyning a local oscillator signal with any received signal, intermediate frequency signals from which monopulse sum and difference signals may be formed, such circuitry comprising:
   (a) a substrate fabricated from a dielectric material substantially transparent to energy in the desired frequency band;
   (b) first, second, third and fourth antenna elements forming a monopulse antenna printed on the substrate, each one of such elements being dimensioned to receive signals in the desired frequency band;
   (c) first, second, third and fourth balanced mixer means disposed on the substrate, each one of such means having a first and a second input port and an output port;
   (d) first, second, third and fourth intermediate frequency output ports printed on the substrate; and
   (e) interconnecting means printed on the substrate for:
      (i) connecting each one of the antenna elements to a respective one of the first input ports of the balanced mixers;
      (ii) dividing the local oscillator signal into four equal signals and applying each one of the four equal signals to a respective one of the second input ports of the balanced mixers; and
      (iii) connecting the output port of each of the balanced mixers to a respective one of the intermediate frequency output ports.

2. The monolithic circuitry as in claim 1 wherein the first, second, third and fourth antenna elements are patch radiators.

3. The monolithic circuitry as in claim 1 wherein the interconnecting means connecting each one of the antenna elements to a respective one of the first input ports of the balanced mixer comprises, in addition to an electrical connection, a termination state which will act as a radio frequency ground for the local oscillator signal.

4. The monolithic circuitry as in claim 1 wherein the interconnecting means dividing the local oscillator signal into four equal signals comprises a Wilkinson power divider splitting a local oscillator signal path from an input port into two signal paths, two more Wilkinson power dividers splitting the two signal paths to four signal paths and a bandpass filter including a one-half wavelength resonator on each path before being applied to such respective second input port of the balanced mixers.

5. The monolithic circuitry as in claim 1 wherein the interconnecting means connecting the output port of each of the balanced mixers to a respective one of the intermediate frequency output ports comprises a radio frequency terminator, a low pass matching filter and an intermediate frequency filter before connecting to the intermediate frequency output port.

* * * * *